United States Patent
Bastioli et al.

(10) Patent No.: US 11,484,053 B2
(45) Date of Patent: Nov. 1, 2022

(54) METHOD FOR THE CULTIVATION OF PLURIENNIAL PLANTS BELONGING TO THE CARDUEAE TRIBE AND FOR THE INTEGRATED RECOVERY OF INULIN, SEEDS AND BIOMASS FROM THE SAID PLANTS

(71) Applicant: Novamont S.p.A., Novara (IT)

(72) Inventors: Catia Bastioli, Novara (IT); Luigi Capuzzi, Novara (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 15/547,943

(22) PCT Filed: Feb. 5, 2016

(86) PCT No.: PCT/EP2016/052487
§ 371 (c)(1),
(2) Date: Aug. 1, 2017

(87) PCT Pub. No.: WO2016/124732
PCT Pub. Date: Aug. 11, 2016

(65) Prior Publication Data
US 2018/0020711 A1    Jan. 25, 2018

(30) Foreign Application Priority Data

Feb. 5, 2015  (IT) .................. 102015000005531
Feb. 5, 2015  (IT) .................. 102015000005539

(51) Int. Cl.
```
A23L 29/244    (2016.01)
C08B 37/00     (2006.01)
A23L 29/206    (2016.01)
A23L 27/30     (2016.01)
A23L 33/21     (2016.01)
```

(52) U.S. Cl.
CPC ............. *A23L 29/244* (2016.08); *A23L 27/33* (2016.08); *A23L 29/206* (2016.08); *A23L 33/21* (2016.08); *C08B 37/0054* (2013.01); *A23V 2002/00* (2013.01)

(58) Field of Classification Search
CPC ...... A23L 29/244; A23L 29/206; A23L 27/33; C08B 37/0054

USPC ........ 426/615, 601, 658, 419, 425, 489, 518
See application file for complete search history.

(56) References Cited

U.S. PATENT DOCUMENTS

2003/0207003 A1 * 11/2003 Silver
2018/0177201 A1 *  6/2018 Peet et al.

FOREIGN PATENT DOCUMENTS

WO   WO-2008/110851 A2   9/2008
WO   WO-2008/110851 A3   9/2008
WO   WO-2010/102806 A1   9/2010

OTHER PUBLICATIONS

Corey et al. "Witloof Chicory: A New Vegetable Crop in the United States", pp. 1-8, https://hort,purdue.edu/newcrop/proceedings1990/VI-414.html. (Year: 1990).*
Figueira et al. ACTA Hort 502 ISHS 1999. The Effect of Plant Density and Fertilization on the production of *Cichorium intybus* L. Roots and Inulin Content, pp. 129-131. (Year: 1999).*
Panashandeh et al. "The Effects of Plant Density on Root Yield and Leaf Area of Chicory", www.researchgate.nt/publication/252322400_Effects_of_Plant_Density_onRoot_, ActaHorticulture, May 2012, pp. 1-9. (Year: 2012).*
Wiklund, A., 1992, Botanical Journal of the Linnean Society/vol. 109, Issue 1, p. 75-123 (abstract only), https://onlinelibrary.wiley.com/doi/abs/10.1111/J.1095-8339.1992.tb00260.x. (Year: 1992).*
Raccuia et al., "Biomass and grain oil yields in *Cynara cardunculus* L. genotypes grown in Mediterranean environment", Field Crops Research, 101 (2007) 187-197.
Fernandez et al., "Industrial application of *Cynara cardunculus* L. for energy and other uses", Industrial Crops and Products, 24 (2006) 222-229.
Grammelis et al., "Cultivation and Characterization of *Cynara cardunculus* for Solid Biofuels Production in the Mediterranean Region", Int. J. Mol. Sci. (2008) 9, 1241-1258.

* cited by examiner

Primary Examiner — Helen F Heggestad
(74) Attorney, Agent, or Firm — Polsinelli PC

(57) ABSTRACT

This invention relates to a method for cultivating pluriennial plants belonging to the Cardueae tribe and for the integrated recovery of inulin, seeds and biomass from the said plants.

19 Claims, No Drawings

METHOD FOR THE CULTIVATION OF PLURIENNIAL PLANTS BELONGING TO THE CARDUEAE TRIBE AND FOR THE INTEGRATED RECOVERY OF INULIN, SEEDS AND BIOMASS FROM THE SAID PLANTS

CROSS REFERENCE TO RELATED APPLICATIONS

This application is a National Phase filing under 35 U.S.C. § 371 of PCT/EP2016/052487 filed on Feb. 5, 2016; and this application claims priority to Application No. 102015000005531 filed in Italy on Feb. 5, 2015 and Application No. 102015000005539 filed in Italy on Feb. 5, 2015, under 35 U.S.C. § 119. The entire contents of each application are hereby incorporated by reference.

DESCRIPTION

This invention relates to a method for the cultivation of pluriennial (also known as "polyannual") plants belonging to the Cardueae tribe and for the integrated recovery of inulin, seeds and biomass from the said plants.

In a first aspect this invention relates to the cultivation of pluriennial plants belonging to the Cardueae tribe which, because of the method of cultivation according to this invention, makes it possible to obtain large quantities of inulin with respect to both the total weight of the roots and the total weight of the plant. The said plants therefore appear to be capable of being used for the integrated recovery of various high added value raw materials, such as in particular inulin, oil and biomass. In a second aspect this invention relates to a method for the integrated recovery of inulin, biomass and seeds and/or their derivatives such as oil and protein flours from the said plant.

Resources of fossil origin have for a long time been the main source of supply for modern industry, providing raw materials for the production of for example fuels, chemical products of various kinds, and energy. With the progressive exhaustion of resources of fossil origin intense research activity has however been initiated in all industrial sectors with a view to identifying alternative means of supply through which these conventional sources can be replaced. Between the various alternative means of supply currently considered adequate to respond to this requirement the possibility of making use of resources of renewable origin with which to replace resources of fossil origin is increasingly mentioned. Unlike resources of fossil origin, resources of renewable origin have the advantage that, as a result of their natural characteristics and through the effect of human cultivation, they are renewed on the scale of a human lifetime, and are therefore almost infinitely available. A typical example of resources of renewable origin comprises plant crops.

Although in general plant crops have been identified as possible alternative sources from which industrial activities can be supplied, there is a still a need to identify plant species which are suitable for generating efficient production systems having a low environmental impact and which do not remove resources and cultivatable land which could otherwise be used for the primary requirements of mankind, such as for example food.

Starting from this requirement it has now surprisingly been discovered that there is the possibility of causing pluriennial plants belonging to the Cardueae tribe to efficiently generate significant quantities of a broad spectrum of types of products of extreme interest: inulin, biomass, seeds and/or their derivatives, such as oil and protein flours. Because of their ability to grow almost without the need for significant fertilising treatments, even in arid ground and in poorly favourable climatic conditions, these plants also have the further advantage that they can be cultivated without withdrawing resources and cultivatable land, which could otherwise be used for the primary requirements of mankind.

Economical and high-yield integrated production of significant quantities of a broad spectrum of types of raw materials of extreme interest, such as inulin, biomass, seeds and/or their derivatives, such as oil and protein flours, also offers the possibility of appreciably diversifying and broadening the range of products and chemical intermediates which can be accessed from a single renewable resource, thus helping to rationalise the production system. Inulin is a linear polysaccharide which mainly comprises molecules of D-fructose held, like starch, as a reserve substance in the roots of many plant species, including those belonging to the Asteraceae family, such as for example Jerusalem artichokes (*Helianthus tuberosus*), chicory (*Cichorium intibus*) and plants of the Cardueae tribe, in particular those of the species *Cynara cardunculus*.

Inulin finds applications in many fields such as for example in the food industry, as a sweetener or as a replacement for fats and flours, in the production of ethanol, in the medical sector, where it is used for example in the measurement of kidney function, in the treatment of intestinal disturbances and as a coadjuvant for vaccines. Given its renewable origin and its potentially extensive availability, inulin is an interesting starting raw material for the chemical industry, being in particular considered a possible raw material for the production of HMF and 2,5-furandicarboxylic acid.

Hitherto inulin has mainly been obtained from chicory roots, from which it is extracted by mixing the ground dry roots with water and subsequently filtering and/or centrifuging the aqueous solution obtained, which is rich in inulin.

The growing interest which the chemical industry is demonstrating in inulin as a possible raw material makes it necessary to identify other sources capable of ensuring greater availability at a lower cost.

Vegetable oils are also now an important raw material for the chemical industry, and one only has to think of the many products from the oil chemical industry and in particular biodiesel, lubricants, and intermediates for detergents. For example, WO2008/138892 describes a process for oxidative cleavage which, starting from vegetable oils containing monounsaturated fatty acid triglycerides, can be used to produce important intermediates for the preparation of polyesters such as for example the saturated dicarboxylic acids, azelaic acid or brassylic acid.

Finally lignocellulose biomass, which is rich in carbohydrate polymers consisting of C5-C6 sugars (hemicellulose and cellulose), is also a potentially important renewable source of fermentable saccharides which can be used to obtain the multiplicity of organic compounds that can be used for chemical intermediates, for example bioethanol and 1,4-butanediol.

This invention in particular relates to a method for the production of pluriennial plants belonging to the Cardueae tribe, characterised in that it comprises the steps of:
  a) sowing seeds of the said plants in a crop density of at least 4 plants per square metre of ground and preferably at least 6 plants per square metre;
  b) optionally controlling the N content of the ground into which the said seeds have been planted;

c) collecting at least a portion of the below-ground part and at least a portion of the above-ground part of the plants obtained from sowing in step a) from the third year of cultivation, between the phenological stage of flowering and the phenological stage of senescence of the said plants.

The pluriennial plants which can be obtained using the method according to this invention make it possible to obtain higher quantities of inulin in respect of both the total weight of the roots and the total weight of the plant. They are also capable of ensuring a significant content of oil-bearing seeds having a high unsaturated fatty acids content and lignocellulose biomass having a low lignin content. Typically pluriennial plants belonging to the Cardueae tribe, which can be obtained by the method of cultivation according to this invention, have an oil seeds content of at least 5% by weight and a lignocellulose biomass content of up to 60% by weight with respect to the total weight of the above-ground part of the said plants, and an inulin content of 25-60% by weight with respect to the total weight of the below-ground part, the latter representing at least 35% by weight of the total weight of the plant. The said plants therefore appear to be capable of being used for the integrated recovery of various high added-value raw materials such as, in particular, inulin, biomass, seeds and/or their derivatives such as oil and protein flours.

This invention therefore also relates to a method for obtaining inulin, biomass and seeds and/or oil and protein flour from pluriennial plants belonging to the Cardueae tribe, comprising the steps of:

d) recovering inulin from the below-ground part of the said plants harvested during step c);
e) separating the seeds and the above-ground biomass of the above-ground part of the said plants harvested during step c);
f) possibly recovering oil and protein flour from the seeds obtained during step e).

This invention relates to the acquisition and use of plants belonging to the Cardueae tribe, preferably plants belonging to the species *Cynara cardunculus*, more preferably from the subspecies *Cynara cardunculus* L. var. altilis (cultivated cardoon). These plants have the advantage that they will grow, almost without the need for significant fertilisation treatments, even in arid ground and under poorly favourable climatic conditions. The method according to this invention may be implemented in ground of the clayey, sandy or silty type, the important thing being to avoid standing water. In a preferred embodiment of the method according to this invention the ground used for sowing the plants is of the clayey type.

Before sowing step a) the said ground may preferably undergo one or more preliminary operations selected from tilling, breaking up, de-stoning, ploughing, hoeing, digging over, drilling, milling, weeding, harrowing, levelling or rolling, with a view to preparing the seed bed, which preferably may be repeated before each cultivation cycle.

Step a) provides for sowing seeds of the said plants in a crop density of at least 4 plants per square metre of ground and preferably at least 6 plants per square metre and even more preferably at least 8 plants per square metre. This operation may be performed using any of the means known for the purpose to those skilled in the art, preferably using a suitable agricultural machine, known as a drill, which may be of the conventional or precision type. Those skilled in the art will be in a position to establish crop density directly in the field during sowing or to determine it by measurements in the field or through aerial and/or satellite images and, if necessary, act to adjust it to the desired value.

Without hereby being bound to any specific theory, it is hypothesised that sowing seeds of plants belonging to the Cardueae tribe in a crop density of at least 4 plants per square metre of ground will help to achieve maximisation of the unit yield of seed, biomass and inulin in the method of cultivation according to this invention.

After sowing step a) in the method according to this invention it is optionally possible to adjust the N content of the ground into which the said seeds have been planted to an N content of less than 200 kg/(ha.year) on the basis both of the soil fertility and crop nutrient uptake, more preferably less than 50 kg/(ha.year), and even more preferably less than 40 kg/(ha.year) (step b) of the process according to this invention). Said step b) may be carried out using any of the methods known for the purpose to those skilled in the art, for example by fertilising the ground with suitable nitrogen fertilisers such as for example ammonium nitrate and ammonium salts, or by using nitrogen sequestrating agents. Said step b) may also be performed by means of one or more cycles of adjusting the N content of the ground, which may also be separated over time.

As for step c) of the method according to this invention, this provides for the harvesting of at least a portion of the above-ground part and at least a portion of the below-ground part of the plants obtained from sowing in step a) from the third year of cultivation, between the phenological stage of flowering and the phenological stage of senescence of the said plants. Harvesting of at least one portion of the below-ground part and at least one portion of the above-ground part of the plants obtained from sowing in step a) may be brought forward to the second year of cultivation, between the phenological stage of flowering and the phenological stage of senescence of the said plants, but with smaller annual yields of all of the products such as inulin, seeds and biomass.

As is known, the life cycle of a living organism, such as for example a plant, can be subdivided into different steps (known as phenological stages) identified by a morphological, physiological, functional and behavioural status induced by the seasonal change in environmental conditions, in particular climatic conditions. In agriculture, scales identifying the different phenological stages of plants have been known and widely applied for some time. The phenological stages taken into consideration in the method according to this invention are those of the BBCH scale, which uses a decimal scale for description and coding. This BBCH scale has been used to describe the life cycle of plants belonging to the species *Cynara cardunculus* in the publication by Archontoulis S. V. et al. "*Phenological growth stages of Cynara cardunculus: codification and description according to the BBCH scale*", Annals of Applied Biology (2010) 253-270. In the method according to this invention the phenological stages of the plants belonging to the Cardueae tribe have been identified and determined according to the BBCH subdivision described in that article. In the meaning of this invention therefore, the annual life cycle of plants belonging to the Cardueae tribe is to be understood to be subdivided into the following phenological stages: stage 0—germination (during the first year of the crop cycle) or sprouting/bud development (second or subsequent years); stage 1—leaf development; stage 2—formation of side shoots/tillering; stage 3—rosette growth; stage 4—development of vegetative plant parts; stage 5—inflorescence emergence; stage 6—flowering; stage 7—formation of fruit and seeds; stage 8—ripening and maturity of fruit and seed; stage 9—senescence of the plant.

Step c) of the process according to this invention may be carried out using any of the means known to those skilled in the art, also depending upon the type of machinery which it is intended to use. For example step c) of the process according to this invention may be carried out by first harvesting at least a portion of the above-ground part of the plants and subsequently harvesting at least part of the below-ground portion of the said plants. Alternatively, at least one portion of the above-ground part of the plants and at least one portion of the below-ground part of the plants may be harvested at the same time. As is known, the below-ground part of the plants comprises the plant's root system in which inulin accumulates.

Thanks to use of the method of cultivation according to this invention the said plants develop particularly extensive and large roots which can penetrate the ground to depths of more than even 2 metres, depending upon the ground and the climate in which they are cultivated. Also inulin is mainly accumulated by the plants in the central and shallow part of the root system, thus making it advantageous in the case of particularly extensive and large roots to harvest only the said central and shallow parts of the root system, broadly corresponding to approximately 60% by weight with respect to their total weight.

In a preferred embodiment of the process according to this invention, a portion of the root system, 60% by weight or more with respect to the total weight of the root system, is harvested in said step c).

Plants cultivated by the method according to this invention are pluriennial, being as a result of their intrinsic characteristics provided with vegetative organs (also known as basal buds) which as they represent the early steps of a new growth axis can give rise to new plants, being therefore capable of remaining on the ground for several years, in the present case for three or more years.

It has surprisingly been discovered that the specific conditions of cultivation identified in the method according to this invention make it possible to obtain plants of the Cardueae tribe with below-ground parts comprising root systems capable of ensuring unit inulin yields (i.e. tonnes per hectare of cultivated surface area) of between 5 and 20 t/ha, and above-ground parts capable of ensuring unit yields of seeds of between 1 and 4 t/ha and dry biomass of between 10 and 25 t/ha, between two specific phenological stages in the third and subsequent years of cultivation.

Although the preceding two years of cultivation do not provide the said unit yields they can nevertheless provide oil seeds in significant quantity, typically 1.5 t/ha or more, and biomass, typically in quantities of 15 t/ha or more.

In a preferred embodiment of the method according to this invention, during the first year of cultivation, after step a) and before step b), or after step b) and before step c), the above-ground parts of the plants obtained from sowing are harvested between the phenological stages of flowering and senescence of the plants.

The above-ground part obtained by treatments applied during the first and second years of cultivation mentioned above preferably undergoes the operations described in steps e) and f) of the process according to this invention, or is used for various other purposes, such as preferably energy recovery through combustion, the production of biogas, the production of animal feeds or the production of organic compounds. In a preferred embodiment of this invention, the above-ground part is sent to an alkaline pretreatment process to obtain a variety of organic compounds such as sugars and lignins, such as for example those described in Italian patent application NO2012A000002 or in patent application WO2013/139839.

After step c) of the process according to this invention it is possible to obtain biomass and oil seeds from the above-ground parts of the harvested plants and also inulin from the below-ground parts of the harvested plants.

Step d) of the process according to this invention provides for the recovery of inulin from the below-ground part harvested during step c). This operation may be performed by any means suitable for the purpose, for example by separating it by extraction from the roots of the plant in hot water. In a preferred embodiment of the process according to this invention the method for obtaining inulin from the below-ground parts of the plants harvested during step c) comprises the steps of:

d-1) comminuting the roots present in the below-ground parts of the plants harvested in step c) in order to obtain cossettes having a maximum thickness of 1 cm, preferably 0.5 cm or less, and more preferably between 0.5 and 2 mm;

d-2) leaching, preferably by means of at least one cavitation treatment, inulin from the said cossettes in presence of an aqueous solution;

d-3) separating an aqueous phase containing inulin and a solid phase containing spent cossettes from said step d-2);

d-4) purifying the said aqueous phase containing inulin.

Before being fed to step d-1) the below-ground parts of the plants advantageously undergo one or more preliminary treatments which are suitable for preparing the roots for comminution. At the time of harvesting and transport, the below-ground parts comprising the roots can in fact be contaminated with foreign bodies which may be of different kinds, for example biomass residues, typically leaves, stalks or stems attached to the roots, stones, earth and even ferrous residues originating from, for example, the equipment used in harvesting. The roots may also have an excessive moisture content which, depending upon the operating procedures adopted, may have an effect on subsequent comminution step d-1). The method for obtaining inulin therefore preferably comprises one or more preliminary steps before step d-1) selected from:

(i) topping;
(ii) cleaning and screening;
(iii) washing;
(iv) drying.

These preliminary steps may be combined together in different ways also depending upon the method of harvesting and transporting the below-ground parts comprising the roots. According to a preferred aspect of this invention the method comprises one or more of the said preliminary steps, preferably in the order indicated above. The said steps may be performed using different items of equipment or using a single item of equipment or in different parts of the same equipment. For simplicity of description reference will be made in the rest of this application to operations referring to equipment capable of carrying out the individual steps, but it is to be understood that this also includes conduct of the operations in a single item of equipment or in different parts of the same equipment.

The preliminary step of topping (i), in particular, has the purpose of separating off any biomass residues, such as for example leaves, stalks or stems which are still attached to the roots. The said topping step may be performed using equipment for the mechanical removal of residues such as, for example, cutters.

The step of cleaning and screening the roots (ii) is typically performed by causing them to pass through vibrating screens, aspiration or electromagnetic systems, and makes it possible to perform the operation of removing greens (removal of other plants and biomass residues discharged together with the roots), de-stoning (removal of stones, pebbles and earth) and the removal of ferrous residues originating for example from the equipment used in harvesting.

The step of washing (iii) makes it possible to remove plants, biomass residues, stones, pebbles and earth, and other residues which may not be completely removed during other treatments, such as for example the step of cleaning and screening the roots (ii), with which it is advantageously associated or replaced. Preferably, the said washing step is carried out using water at temperatures of 50° C. or below so as to minimise the dissolution and consequent loss of inulin during this step. Advantageously, washing may be performed by immersing the roots or causing them to pass beneath water jets.

The drying step (iv) makes it possible to control the water content of the roots. This has the aim of on the one hand limiting phenomena which degrade the roots, thus offering a possible longer storage period, and on the other hand contributing to the satisfactory result of subsequent step (d-1); for example too low a water content may result in excessive fragmentation of the cossettes, with the consequent formation of dusts.

The drying step is typically performed in equipment known as dryers which may be of the vertical or horizontal type with rotating cylinders. Drying takes place by placing the roots in contact with a hot flow of gas, generally air, maintained at a humidity content below the saturation point at the temperature of use. Preferably, drying is carried out using dry air at temperatures of 90° C. or below, preferably 80° C. or below, more preferably 50° C. or above.

The roots which are fed to step d-1) of the process according to this invention advantageously have a water content of 3-55% by weight, preferably 15-50% by weight, more preferably 20-40%. The said water content is determined using methods of analysis known to those skilled in the art.

The roots are then fed to step d-1) of the process according to this invention which causes them to be comminuted in order to produce cossettes having a maximum thickness of 1 cm, preferably 0.5 cm or less, and more preferably between 0.5 and 2 mm, so as to allow the subsequent step of leaching to be performed. In the meaning of this invention, by the term comminution is meant any treatment which subdivides and reduces the roots into smaller cossettes, such as for example cutting, chopping, slicing, shearing, fragmenting, flaking, grinding or mincing the roots. The cossettes obtained through the comminuting operation have a greater surface area for subsequent leaching step d-2), increasing the efficiency and rate of extraction of inulin from the roots by the aqueous solution. In the meaning of this invention, the term cossettes means portions of roots such as for example particles, shavings, pieces, fragments, flakes or cossettes of any shape which can be obtained through a comminuting operation.

Step d-1) of the process according to this invention may be carried out in any equipment which is suitable for subdividing and reducing the roots of plants belonging to the Cardueae tribe to pieces, such as for example cutting tools and impact tools, for example the cutters commonly used for sugar beet, root chopping machines, hammer mills, roller mills, blade mills or flakers. The comminuting operation is preferably carried out at a temperature of 90° C. or below, more preferably 80° C. or below and even more preferably 70° C. or above so as to limit heat stress and reduce any phenomena degrading the inulin in the roots.

Preferably, at the end of step a) the cossettes are pasteurized in order to deactivate inulin-degrading enzymes (e.g. inulinases), in order to avoid undesired degradation of inulin before leaching. Such a pasteurization treatment may be also performed before step a), on the roots before comminution.

After step d-1) the process according to this invention provides for step d-2) of leaching inulin from the cossettes in presence of an aqueous solution. Said step d-2) may be carried out by any treatment suitable for this purpose and in any equipment suitable for this purpose, hereinafter singularly or collectively called "equipment", if not otherwise explicitly detailed.

In a preferred embodiment of the present invention, said step d-2) is carried out by means of at least one cavitation treatment in presence of an aqueous solution, in any equipment suitable for the purpose (known as "cavitators"), for example hydrodynamic cavitators, ultrasonic cavitators as well as static cavitators of both the batch or continuous type, and of both the co-current and counter-current type. Typical examples of commercially available cavitators suitable for use in step b) of the process according to this invention are SPR (Shockwave Power Reactor) and Biopush cavitators. In a preferred embodiment of the present invention, step b) of the process according to this invention is performed by means of at least one hydrodynamic cavitation treatment. Alternatively, step d-2) can be performed by means of an ultrasonic extraction.

In a further preferred embodiment, said step d-2) is carried out using one or more "diffusers", for example batch reactors or continuous remixing reactors, solid-liquid extractors, of both the co-current and counter-current types, operating on a continuous or batch cycle, and which may be horizontal or vertical, or immersion tanks fitted with modular conveyor belts. Typical examples of commercially available equipment suitable for use in step b) of the process according to this invention are "RT" horizontal rotor extractors, DDS inclined rotating screw extractors and vertical rotating towers.

In an embodiment of the process according to the present invention, step d-2) is carried out also by combining one or more cavitation treatments with one or more treatments with diffusers as disclosed in the present application.

In order to maximise intimate contact between the cossettes and the aqueous solution said step d-2) is advantageously carried out in one or more equipment, which may also be arranged in groups or in sequences depending upon the desired process configuration. For example, step d-2) of the process according to this invention may be carried out using a single cavitator or two or more cavitators placed in series. Where not explicitly described otherwise, when reference is made in this invention to a treatment carried out in an equipment this is intended to include process configurations which comprise two or more equipments arranged in series. Where the process according to this invention is carried out in continuous mode, step d-2) may also be carried out using two or more cavitators, preferably two or more hydrodynamic cavitators of the types described above which can work simultaneously or alternately, in series or in parallel, thus making it possible to shut down one of cavitators diffusers without interrupting the process.

The said leaching operation may be carried out by feeding the cossettes at ambient temperature, or in order to assist inulin extraction by preheating them, preferably in water, to temperatures of 90° C. or below, more preferably 80° C. or below, and even more preferably 30° C. or above, more preferably 40° C. or above, even more preferably 70° C. or above, before they enter the equipment for a time which is preferably of 5 minutes or less. By opening the plant cells the increased temperature makes it possible to aid passage of the inulin into the liquid phase, thus maximising the yield from step d-2) and at the same time avoiding excessive stress on the cossettes, thus limiting any phenomena degrading the inulin. With the same object of increasing the yield from leaching step d-2) in the process according to this invention the step is preferably performed at temperatures of 90° C. or below, more preferably 80° C. or below, and even more preferably 30° C. or above, more preferably 40° C. or above, even more preferably 70° C. or above. When performing step d-2) by one or more diffusers, the temperature is maintained preferably in the range 70-90° C., whereas cavitation treatments result already effective even at temperatures below 70° C. In this case, temperature control during step d-2) is carried out for example by preheating the aqueous solution (which leaches inulin from the roots) and/or using equipment provided with temperature control systems. The use of temperatures within the ranges indicated above during step d-2) of the process according to this invention also has the further advantage of reducing the viscosity of the aqueous solution, thus helping to ease pumping, and increasing the solubility of inulin in the aqueous solution. In order to increase the yield from leaching of the cossettes, before step d-2) and after the preheating step or during step d-2) they may also be pressed at pressures of preferably 5 kg/cm2 or less, for example by means of roller presses or calendars.

In addition to not providing further benefits for process yield, leaching temperatures higher than those indicated above would increase its cost and could give rise to the formation of undesired by-products as a result of phenomena degrading the inulin and other components of the cossettes.

The at least one cavitation treatment in step d-2) of the process according to the present invention is preferably performed at a pressure in the range of 1-35 bar, preferably of 1-18 bar.

The at least one cavitation treatment in step d-2) of the process according to the present invention is carried out preferably for a time of less than 60 minutes, more preferably in the range of 5-40 minutes.

In a preferred embodiment, step d-2) of the process according to this invention is carried out by means of at least one cavitation treatment performed at temperatures in the range of 30-90° C. preferably of 40° C.-80° C., even more preferably of 70-80° C., at pressures in the range of 1-35 bar and preferably for a time of less than 60 minutes, more preferably in the range of 5-40 minutes.

In another preferred embodiment step d-2) of the process according to this invention is carried out in a continuous counter-current diffuser at temperatures of 90° C. or below, more preferably 80° C. or below and even more preferably 70° C. or above.

As far as the aqueous solution which is to be used in step d-2) of the process according to this invention is concerned, in addition to water this may contain disinfecting agents (to inhibit the action of any bacteria which would deteriorate the insulin), such as for example hydrogen peroxide, sulfur dioxide, active chlorine, ammonium bisulfate, fermentation inhibiters, acids or bases to control pH, inorganic salts to alter the ionic strength of the solution, and surfactants in order possibly to improve the wettability of the cossettes. In a preferred embodiment the aqueous solution is characterised by a pH in the range between 5 and 9, preferably between 6 and 8.

In the process according to this invention step d-2) is preferably carried out using up to 15 parts by weight of an aqueous solution per part of dry cossettes, more preferably from 12 to 2 parts by weight of aqueous solution per part of dry cossettes, and more preferably from 10 to 3 parts by weight of aqueous solution per part of dry cossettes.

In a particularly preferred embodiment of the process according to this invention step d-2) is preferably carried out by treating the cossettes with at least one cavitation treatment in cavitation treatment at temperatures in the range of 30-90° C., preferably of 40° C.-80° C., even more preferably of 70-80° C., at pressures in the range of 1-35 bar and preferably for a time of less than 60 minutes, more preferably in the range of 5-40 minutes, more preferably in a hydrodynamic cavitator using up to 15 parts by weight of aqueous solution per part of dry cossettes, more preferably from 12 to 2 parts by weight of aqueous solution per part of dry cossettes, and more preferably from 10 to 3 parts by weight of aqueous solution per part of dry cossettes, thus obtaining an inulin leaching yield with respect to the total inulin present in the roots fed to the process which is more than 90% by weight, and preferably 94% by weight or more.

In another particularly preferred embodiment of the process according to this invention step d-2) is preferably carried out at temperatures of 90° or below, 80° C. or below, even more preferably 70° C. or above, more preferably in a continuous counter-current diffuser using up to 15 parts by weight of aqueous solution per part of cossettes, more preferably from 12 to 2 parts by weight of aqueous solution per part of cossettes, and more preferably from 10 to 3 parts by weight of aqueous solution per part of cossettes, thus obtaining an inulin leaching yield with respect to the total inulin present in the roots fed to the process which is more than 90% by weight, and preferably 94% by weight or more.

Inulin leaching yield may be determined according to any one of the methods known to the skilled person on this purpose, for example by determining inulin content on the aqueous phase obtained at the end of step d-2).

Preferably, high pressure liquid chromatograph (HPLC) equipped with refractive index (RI) detector is used for determining inulin content. For example, a sample obtained in step d-2), is treated, for example by filtration or any other suitable treatment for obtaining an aqueous phase, and then concentrated and weighed. A sample of this mixture (1 mg) is dissolved in a of 0.9 ml of 0.005N H2SO4 and 0.1 mL of DMSO solution, filtered (filter pore diameter: 0.20 μm) and then analysed by HPLC after calibration using a reference standard.

After leaching step d-2) the process according to this invention provides for step d-3) in order to separate out the aqueous phase containing inulin from the solid phase containing the spent cossettes. In the meaning of this invention by solid phase is also meant suspensions, sludges (known as "slurry") and any fraction having a sufficiently high density to separate out from a supernatant.

Step d-3) of the process according to this invention may be carried out according to any means known to those skilled in the art to separate a solid phase from a liquid phase, for example by filtering, centrifuging, sedimentation, settling, pressing, crushing or using any combination of these methods. The said separation may be performed in equipment other than that in which step d-2) is performed, or in the same equipment. For example, when step d-2) of the process is carried out in hydrodynamic cavitator, separation of the aqueous phase containing inulin from the solid phase containing the spent cossettes typically takes place at the end of the diffuser, for example using a centrifugal decanter which discharges the solid phase separating out and allows the aqueous phase to flow away.

The aqueous phase separated during step d-3) of the process according to this invention has an inulin content which, depending among other things on the initial quantity of inulin in the roots and the quantity of water used in the leaching step, typically lies between 3 and 20%, preferably up to 18% by weight, in ideal conditions preferably between 6 and 12% by weight of inulin, while the solid phase containing the spent cossettes also has a water content of 70% or less, preferably 60% by weight or less.

In order to avoid precipitation of the inulin from the aqueous solutions present during the various steps of the process according to this invention the said aqueous solutions are advantageously heated and held at a temperature of or greater than the temperature at which the concentration of inulin present is below its solubility at that temperature.

In order to maximise yield from the process the solid phase separated out during step d-3) is preferably treated to recover at least some of the water and inulin present in it. This may be subjected to a step of mechanical pressing, which is advantageously carried out using one or more presses of various kinds, which are preferably continuous. The said operation may be performed by feeding the solid phase at ambient temperature, or in order to facilitate the recovery of water and inulin by preheating the said solid phase to temperatures preferably of 90° C. or below, more preferably 80° C. or below, and even more preferably 30° C. or above, more preferably 40° C. or above, even more preferably 70° C. or above. The increase in pressure generated during this step may give rise to an increase in internal temperature. The presses may therefore be provided with cooling systems preventing an excessive temperature rise, which could have an adverse effect on the quality of the inulin.

In a preferred embodiment of this invention, at the end of the said pressing step the solid phase from which at least part of the water and inulin has been recovered has a water content of 50% or less, more preferably 40% by weight or less.

In order to increase the yield of the inulin leaching from the cossettes, step d-2) and step d-3) of the process according to the present invention are preferably performed more than once, by at least partially recycling the output of a first leaching treatment to at least a second leaching treatment, preferably performed on the same equipment in which the first leaching treatment has been performed, optionally subjecting it to an intermediate separation of the aqueous phase containing inulin from the solid phase containing the spent cossettes and advantageously adding new aqueous solution in order to restore, during the second leaching treatment, the selected amount of parts by weight of aqueous solution per part of dry cossettes. A portion of the solid phase obtained at the end of step d-3) of the process according to the present invention is preferably recycled to step d-2) for being newly subjected to a leaching treatment, advantageously being mixed with a fresh stream of cossettes.

In such a configuration, for example the first leaching treatment can be performed combining also cavitation treatments with leaching treatments by means of diffusers.

The solid phase obtained at the end of step d-3) of the process according to this invention, which may or may not have undergone the pressing operation described above, may then be used for various purposes, such as preferably energy recovery through combustion, the production of biogas, the production of animal feeds, or the production of organic compounds. In a preferred embodiment of this invention the said solid phase is sent to a pre-treatment process for obtaining a multiplicity of organic compounds such as sugars and lignins. The technologies may be steam explosion technologies with or without washing pretreatments in acid, basic or neutral environments, such as for example those described in patent application WO 2010/113129, WO 2012/042497 and WO 2012/042545, or processes in an alkaline environment such as for example those described in steps b) to d) of Italian patent application NO2012A000002 or patent application WO2013/139839. The liquid phase separated from the solid phase by the pressing operation obtained at the end of step d-3) also contains dissolved inulin and is preferably pooled with the aqueous phase separated from step d-3) for subsequent step d-4) of the process according to this invention.

In step d-4) of the method of obtaining inulin according to this invention, the aqueous phase containing inulin undergoes one or more purification treatments. Depending upon the final use for which the inulin is intended, the said purification treatments are preferably selected from the group comprising: concentration by evaporation of some of the water present, carbonatation treatment, treatment with an aqueous solution of $Ca(OH)_2$ (fining) preferably followed by carbonatation, crystallisation, centrifuging, filtration, microfiltration, nanofiltration, ultrafiltration, lyophilisation, osmosis, settling, refining or any technique which is suitable for separating a solid from a liquid, and combinations thereof. These purification treatments may be combined together in various ways which also depend on the quality of the inulin and manner in which it is desired to obtain it for subsequent uses. According to a preferred aspect of this invention the process comprises one or more of the said purification treatments, more preferably selected from the group comprising concentration through evaporation of some of the water, filtration, microfiltration, nanofiltration, ultrafiltration and osmosis.

As far as concentration through the evaporation of water is concerned, this is preferably carried out under conditions such as not to degrade and/or hydrolyse the inulin present. In a preferred embodiment, the said concentration is carried out by multistep evaporation, which may be co-current or counter-current, with a number of steps equal to 3 or more, preferably between 4 and 6. Preferably, the multiple step evaporation treatments are carried out co-currently, so as to limit the formation of by-products.

As far as treatment with an aqueous solution of $Ca(OH)_2$, also known as fining, is concerned, this has the object of eliminating foreign substances (non-sugars) before the subsequent steps of processing. In the said treatment, the aqueous phase is mixed with the aqueous solution of $Ca(OH)_2$ (also known as milk of lime), which may bring about decomposition of the nitrogen-containing bases present with the consequent release of gaseous $NH_3$ and also the precipitation, typically in colloidal form, of many impurities such as for example sulphate, phosphate, citrate or oxalate anions, which precipitate out as their corresponding calcium salts, and organic substances such as proteins, saponins and pectins. Preferably, when it is carried out, fining is carried out at a pH of 10 or more, more preferably at pH 10-11,5, and at temperatures of 90° C. or below, more preferably 80° C. or below, and even more preferably 30° C. or above, more preferably 40° C. or above, even more preferably 70° C. or above. In preferred embodiment of the present invention, such a treatment is performed using calcium hydroxide at 0.2% for extracted material or 0.4% calcium oxide equivalent for pressed juice.

On completion of the fining treatment, a sludge is obtained comprising precipitates and colloids and an aqueous phase containing inulin, which is subsequently separated off, preferably by filtration. In order to facilitate filtration after fining, a carbonatation treatment is preferably performed by injecting a gas rich in $CO_2$, preferably by bubbling, which causes precipitation of the milk of lime (forming $CaCO_{3(s)}$) which in turn thickens the sludge. The said carbonatation step is carried out in such a way as to keep the pH at low values, preferably 9 or above. Once carbonatation has been performed the solid phase is separated out from the liquid phase containing the inulin. This separation may be performed using any one of the means known to those skilled in the art to separate a solid phase from a liquid phase, for example by means of filtering, centrifuging, sedimentation, settling or using any combination of these methods.

The by-products obtained during the said purification treatments, such as for example the solid phase separated out during fining, may be further treated to recover any inulin which is still present therein, preferably by recycling them in suitable steps of this process, or they may in turn be used to recover other components or as secondary products of the process.

In a preferred embodiment, at the end of the process according to this invention the inulin is in the form of a saturated aqueous solution obtained by at least one treatment of evaporation of some of the water present in the aqueous phase at the end of step d-3) of the process. In this way the inulin may be directly used as a raw material for subsequent reactions for the synthesis of monomers and added value chemical intermediates such as for example HMF, 2,5-furandicarboxylic acid, as is, or converted into fructose through chemical or enzyme hydrolysis. Alternatively, and according to the need for storage and subsequent use, the inulin may be recovered by precipitation, typically by reducing the temperature and subsequently separating out the solid from the mother liquors according to any of the methods known for the purpose to those skilled in the art.

Depending on the final use of the inulin obtained by the process according to the present invention, further purification and fractionation treatment may be performed.

The resulting inulin can be indeed treated with cation and anion exchanger resins to demineralize and decolorize it, thus removing the secondary metabolites. Chromatographic fractionation by size exclusion generally yields two fractions: short-chain fructooli-gosaccharides with mono- and disaccharides, and a high-dp fraction. Fractionation may also be achieved using low temperature or ethanol precipitation of the high molecular weight fraction or using ultra- and nanofiltration. The clarified syrup may be then further concentrated in a suitable apparatus for example at 90° C. and from 600 to 50 mbar and the inulin can then be newly precipitated by using 10% vol of ethanol respect to extracted solution.

With regard to obtaining biomass and seeds from the above-ground parts, step e) provides for separation of the seeds and the above-ground biomass. This step is preferably performed mechanically, more preferably at the same time as the above-ground parts are harvested.

Subsequently the seeds obtained from step e) of the process according to this invention are processed for the extraction of oil (step f) of this process, which can be used for various purposes. The said extraction may be performed mechanically, by using chemical solvents (e.g. hexane, benzene, toluene), possibly in the presence of enzymes, and may be followed by subsequent refining by means of physical, chemical or enzyme treatments.

In a preferred aspect of this invention the oil obtained in step f) of the process may be used to produce biofuels and for the production of chemical intermediates such as carboxylic acids and their derivatives. The protein flour which is preferably obtained during step f) of the process according to this invention may be used in the production of animal feeds. In a preferred embodiment of this invention the oil extracted during step f) of the process undergoes a hydrogenation process such as, for example, those described in Italian patent applications NO2013A000005 or MI2014A002204.

According to a preferred embodiment of the invention, the oil obtained undergoes chemical and/or fermentation treatments (directly or after selective hydrogenation treatment in order to maximise the monounsaturated fatty acids content) for the recovery of derivatives comprising monofunctional or bifunctional carboxylic acids. Preferably, the oil undergoes continuous or batch oxidative cleavage processes such as those described in patent applications WO 2008/138892 and WO 2011/080296. One alternative comprises subjecting the oil and a derivative thereof (acid or methyl ester) to omega-oxidation processes by means of a fermentation route, possibly followed by hydrogenation reactions.

In both cases the bifunctional derivatives obtained can be used as monomers for the synthesis of polymers.

Within the scope of this invention it is also possible to envisage that the seeds may be harvested together with the biomass, without separation, and that all the above-ground part of the plant should be used as fuel; alternatively that the seeds be harvested separately and used directly for animal feeds in small quantities, having regard to their poor digestibility.

The biomass obtained from step e) of this process may then be used for various purposes, such as preferably energy recovery through combustion, the production of biogas, the production of animal feeds or the production of organic compounds. In a preferred embodiment of this invention the biomass is passed to a pretreatment process for obtaining a variety of organic compounds such as sugars and lignins. The technologies may be steam explosion with or without washing pretreatments in acid, basic or neutral environments, such as for example those described in patent applications WO 2010/113129, WO 2012/042497 and WO 2012/042545 or processes in alkaline environments such as, for example, those described in steps from b) to d) of Italian patent application NO2012A000002 or patent application WO2013/139839.

The invention is now described with some examples to be understood as being purely illustrative, and not exhaustive, of the same.

EXAMPLES

Example 1. Evaluation of the Effect of the Phenological Stage and Year of Cultivation on Biomass, Root and Inulin Yield in *Cynara Cardunculus* L. Grown in Mediterranean Environment Materials and methods Open field cultivation experiments A cultivated cardoon genotype (*Cynara cardunculus* L. var. altilis DC) named Trinaseed, was considered in our study. The experimental fields were sown starting from October, 2010. The agronomic evaluations were carried out in the 2014-2015 agricultural season at the Experimental Field Station of Matrica in Porto Tones, Sassari-Italy. Plant material was arranged in a slit-plot experimental design with three replications represented by 3 plots of 60 m² each. Sowing density was 8 plants m², with an inter and intra-row distances of 0.75 and 0.17 m, respectively. Sowing operation was carried out using a conventional drill. Field experiments were conducted under low chemical inputs. Crop water requirements were satisfied by rain. In the first year, plants were fertilized with N at 36 kg ha$^{-1}$. In the second, third and fourth years, the fertilization rates were calculated on the basis of the soil fertility and crop nutrient uptake.

Biomass, root and inulin production

With the aim of determining the kinetics of accumulation of aerial and root biomass during the growth cycle of the plants, the whole aboveground biomass and roots of 9 plants (3 plants per 3 plots) per each year of cultivation were collected at different BBCH phenological stages identified by Archontoulis et al. 2010 (Archontoulis S. V. et al. 2010 "Phenological growth stages of *Cynara cardunculus*: codification and description according to the BBCH scale" Annals of Applied Biology 2010; 253-270), as follows:

Stage 51: Beginning of stem elongation; main inflorescence buds visible between the newly formed leaves (hardly detectable). No branching yet;

Stage 60: 600 First flower petals visible on main stem inflorescence;

Stage 69: End of flowering of nth order stem inflorescence.

At the fully ripened stage of the seeds (corresponding to BBCH Stage 89: Majority of heads are opened, brown-yellow, dry and senesced. Seeds fully ripened; dispersal evident), the aerial biomass, root and achenes were harvested considering the same operative protocols used for the abovementioned samplings. In addition, to verify the root and the inulin production after the harvesting operation of the crop at the BBCH Stage 89, the whole hypogean biomass of 9 plants for each year of cultivation were also collected at the BBCH Stage 99 (Plant dead and dry, moisture around 10%. New leaves from sprouting visible (=step 10))

For each of the analyzed BBCH stage, the aerial part of the plants and roots were collected in the open field experiments and immediately weighed to determine the fresh weight. In order to evaluate moisture content, an amount (10 g three times replicated) of homogenized plant material was then oven-dried at 105° C. until the moisture level was constant (24 h) to determine the dry matter (DM) content and the dry weight of the abovementioned samples.

A representative sample of each aforementioned root was collected to determine the kinetics of inulin content during the growing season. Biomass, seed, root and inulin yield are reported for the second, third and fourth year in Table 1 below.

TABLE 1

| Year of cultivation | Phenological Stage BBCH | Dry aerial biomass Yield (t/ha DM) | Seed Yield (t/ha DM) | Root Yield (t/ha DM) | Inulin Yield (t/ha DM) |
|---|---|---|---|---|---|
| 2 | 51 | 11.63 | — | 4.66 | 1.75 |
|   | 60 | 23.91 | — | 10.52 | 3.22 |
|   | 69 | 22.44 | — | 10.27 | 3.45 |
|   | 89 | 13.46 | 1.34 | 9.25 | 4.91 |
|   | 99 | — | — | 9.39 | 5.44 |
| 3 | 51 | 13.08 | — | 14.51 | 6.35 |
|   | 60 | 11.47 | — | 18.06 | 6.10 |
|   | 69 | 12.22 | — | 22.41 | 7.04 |
|   | 89 | 12.01 | 1.42 | 17.64 | 8.32 |
|   | 99 | — | — | 15.12 | 8.95 |
| 4 | 51 | 13.76 | — | 15.71 | 6.84 |
|   | 60 | 13.31 | — | 23.62 | 7.22 |
|   | 69 | 13.60 | — | 28.64 | 11.36 |
|   | 89 | 10.13 | 1.40 | 21.59 | 11.46 |
|   | 99 | — | — | 19.28 | 10.82 |

Example 2. Evaluation of the Effect of the Sowing Density (4 And 8 Plants Per Square Meter) and Phenological Stage on Biomass, Root and Inulin Yield in *Cynara Cardunculus* L. Grown in Mediterranean Environment Materials and methods Open field cultivation experiments A cultivated cardoon genotype (*Cynara cardunculus* L. var. altilis DC) named Trinaseed at a fourth year of cultivation, was considered in our study. The trials were conducted in 2014/2015 growing season at the Experimental Field Station of Matrica in Porto Tones, Sassari-Italy. The experimental fields were sown in October, 2010. Plant material was arranged in a split-plot experimental design with three replications represented by 3 plots of 60 m² each. Sowing density were 4 and 8 plants m², with an inter-row distances of 0.75 m and 0.34 m and 0.17 m as intra-row distances, respectively. Sowing operation was carried out using a conventional drill. Field experiments were conducted under low chemical inputs. Crop water requirements were satisfied by rain. In the first year, plants were fertilized with N at 36 kg ha$^{-1}$. Starting from the second year of cultivation, the fertilization rates were calculated on the basis of the soil fertility and crop nutrient uptake.

Biomass, root and inulin production

For each of the two sowing density (8 and 4 plants per square meter), the whole aboveground biomass and roots of 9 plants (3 plants per 3 plots) were collected at different BBCH phenological stages identified by Archontoulis et al. 2010, as follows:

Stage 51: Beginning of stem elongation; main inflorescence buds visible between the newly formed leaves (hardly detectable). No branching yet;

Stage 60: 600 First flower petals visible on main stem inflorescence;

Stage 69: End of flowering of nth order stem inflorescence.

At the fully ripened step of the seeds (Stage BBCH 89: Majority of heads are opened, brown-yellow, dry and senesced. Seeds fully ripened; dispersal evident according to Archontoulis et al., 2010), the aerial biomass, root and achenes were harvested considering the same operative protocols used for the abovementioned samplings.

In addition, to verify the root and the inulin production after the harvesting operation of the crop (at the BBCH Stage 89), the whole hypogean biomass of 9 plants per year of cultivation were also collected at the BBCH Stage 99 (Plant dead and dry, moisture around 10%. New leaves from sprouting visible=step 10 according to Archontoulis et al. 2010).

At each sampling time, the harvested aerial part of the plants and roots were immediately weighed to determine the fresh weight. In order to evaluate moisture content, an amount (10 g three times replicated) of homogenized plant material was oven-dried at 105° C. until the moisture level was constant (24 h) to determine the dry matter (DM) content and the dry weight of the abovementioned samples.

A representative sample of each aforementioned root was collected to determine the kinetics of inulin content during the growing season.

RESULTS

| Phenological Stagep BBCH | Sowing density (plants per square meter | Dry aerial biomass Yield (t/ha DM) | Seed Yield (t/ha DM) | Root Yield (t/ha DM) | Inulin Yield (t/ha DM) |
|---|---|---|---|---|---|
| 51 | 8 | 13.76 | — | 15.71 | 6.84 |
| 51 | 4 | 6.77 | — | 9.23 | 4.20 |
| 60 | 8 | 13.31 | — | 23.62 | 7.23 |
| 60 | 4 | 8.64 | — | 15.03 | 5.06 |
| 69 | 8 | 13.60 | — | 28.64 | 11.36 |
| 69 | 4 | 9.94 | — | 17.81 | 7.70 |
| 89 | 8 | 10.13 | 1.40 | 21.59 | 12.32 |
| 89 | 4 | 8.38 | 1.10 | 15.03 | 8.24 |
| 99 | 8 | — | — | 19.28 | 10.82 |
| 99 | 4 | — | — | 14.64 | 8.17 |

The invention claimed is:

1. A method for cultivating polyannual plants belonging to the Cardueae tribe, which comprises the steps of:
    a) sowing the seeds of said plants with a crop density of at least 4 plants per square meter of soil;
    b) optionally adjusting the content of N in the soil on which said seeds were planted at a content of N of less than 50 Kg/(ha*year);
    c) collecting at least a portion of the underground part and at least a portion of the aerial part of the plants raised from the sowing of stop a) starting from the third year of cultivation, between the phenological stage of flowering and the phenological stage of senescence of such plants; wherein said portion of the underground part is a portion of the root system amounting to 60% or more of the total weight of the root system;
    d) recovering inulin from the underground part of said plants collected in the step c);
    e) separating the seeds and the biomass from the aerial part of said plants collected in the step c); and
    f) Wherein the crop water requirements are satisfied by rain; and
    wherein said root system ensures inulin yield of between 5 and 20 t/ha, and the aerial part ensures a dry biomass of between 10 and 25 t/ha between said two phenological stages in the third and subsequent years of cultivation.

2. The method according to claim 1, comprising, after step a) and before step h) or after step h) and before step c), the step of collecting in the first year of cultivation at least a portion of the aerial part of the plants raised from the sowing of step a), between the phenological stage of flower induction and the phenological stage of senescence of such plants.

3. The method according to claim 2, comprising the step of separating the seeds from the biomass of said aerial part.

4. The method according to claim 3, comprising the step of extracting the oil from said seeds.

5. The method according to claim 2, comprising, after step a) and before step b) or after step b) and before step c), the step of collecting in the second year of cultivation at least a portion of the aerial part of the plants raised from the sowing of step a), between the phenological stage of flowering and the phenological stage of senescence of such plants.

6. The method according to claim 5, comprising the step of separating the seeds from the biomass of said aerial part.

7. The method according to claim 6, comprising the step of extracting the oil from said seeds.

8. The method according to claim 5, comprising the step of extracting the oil from said seeds.

9. The method according to claim 1, comprising, after step a) and before step b) or after step b) and before step c), the step of collecting in the second year of cultivation at least a portion of the aerial part of the plants raised front the sowing of step a), between the phenological stage of flowering and the phenological stage of senescence of such plants.

10. The method according to claim 9, comprising the step of separating the seeds from the biomass of said aerial part.

11. The method according to claim 10, comprising the step of extracting the oil from said seeds.

12. Inulin, seeds and biomass obtained from collected portions of polyannual plants belonging to the Cardueae tribe obtainable by means of the method according to claim 1.

13. The method according to claim 1, further comprising the step of:
    g) obtaining the oil and the protein meal from said seeds obtained in step e).

14. The method according to claim 1, in which said step d) comprising the steps of:
    d-1) comminuting, the roots contained in the underground part of the plants collected in step c) to obtain cossettes having maximum thickness of 1 cm;
    d-2) leaching inulin from said cossettes with an aqueous solution;
    d-3) separating from step d-2) an aqueous phase, containing inulin, and a solid phase, containing exhausted cossettes;
    d-4) purifying said aqueous phase containing inulin.

15. The method according to claim 14, in which said step d-2) is performed by means of at least one cavitation treatment.

16. The method according to claim 13, in which said step d) comprising the steps of:
    d-1) comminuting the roots contained in the underground part of the plants collected in step c) to obtain cossettes having maximum thickness of 1 cm;
    d-2) leaching inulin from said cossettes with an aqueous solution;
    d-3) separating from step d-2) an aqueous phase, containing inulin, and a solid phase, containing exhausted cossettes;
    d-4) purifying said aqueous phase containing inulin.

17. The method according to claim 16, in which said step d-2) is performed by means of at least one cavitation treatment.

18. The method according to 1, which further comprises the step b of adjusting the content of N in the soil on which said seeds were planted at a content of N of less than 50 Kg/(ha*year).

19. The method according to claim 1, wherein the aerial part ensures unit yields of seed of between 1 and 4 t/ha.

* * * * *